United States Patent [19]

Tobin

[11] Patent Number: 4,773,031
[45] Date of Patent: Sep. 20, 1988

[54] METHOD AND CIRCUIT FOR DIGITAL FREQUENCY MULTIPLICATION

[75] Inventor: Arthur S. Tobin, Portland, Oreg.

[73] Assignee: Tektronix, Inc., Beaverton, Oreg.

[21] Appl. No.: 685,668

[22] Filed: Dec. 24, 1984

[51] Int. Cl.[4] .............................................. G06F 7/68
[52] U.S. Cl. ...................................... 364/703; 377/47
[58] Field of Search ............................... 364/701–703; 377/47

[56] References Cited

U.S. PATENT DOCUMENTS

| | | | |
|---|---|---|---|
| 3,673,391 | 6/1972 | Lougheed | 364/703 |
| 3,822,640 | 8/1974 | Cederquist et al. | 377/47 |
| 3,828,169 | 8/1974 | Fluet | 364/703 |
| 3,970,954 | 7/1976 | Even | 364/703 |
| 4,017,719 | 4/1977 | Kaplan et al. | 364/701 |
| 4,086,471 | 4/1978 | Takahashi | 377/47 |
| 4,144,489 | 3/1979 | Ward et al. | 331/1 A |
| 4,166,249 | 8/1979 | Lynch | 364/701 |
| 4,242,639 | 12/1980 | Boone | 328/155 |
| 4,244,027 | 1/1981 | Shai | 364/703 |
| 4,339,722 | 7/1982 | Sydor et al. | 377/47 |
| 4,413,350 | 11/1983 | Bond et al. | 364/703 |

FOREIGN PATENT DOCUMENTS 2343439 6/1973 Fed. Rep. of Germany .
2644868 4/1978 Fed. Rep. of Germany .

OTHER PUBLICATIONS

Lo et al., "A Simple Design for a Digital Programmable Frequency Multiplier", Int. J. Electronics, 1979, vol. 46, No. 5, 535–542.

Primary Examiner—Gary V. Harkcom
Assistant Examiner—Tan V. Mai
Attorney, Agent, or Firm—Paul S. Angello; Robert S. Hulse

[57] ABSTRACT

A method and circuit employ digital techniques in processing an input signal of a first frequency to develop an output signal of a second frequency that is a multiple of the first frequency. During each cycle of the input signal, a presettable down counter (146) is decremented from its maximum value at a rate of $1/T_1$. The digital word appearing at the output of the down counter at the end of the cycle is programmed into an up counter (278) that is clocked at a rate of $1/T_2$. The frequency of the signal developed at the overflow output (336) of the up counter is divided by two by a flip-flop (342) whose output (348) provides a signal of a frequency which is $T_1/2T_2$ times that of the input signal. The frequency of the output signal changes after one cycle of a change in frequency of the input signal. The frequency multiplication factor can be a noninteger value.

9 Claims, 4 Drawing Sheets

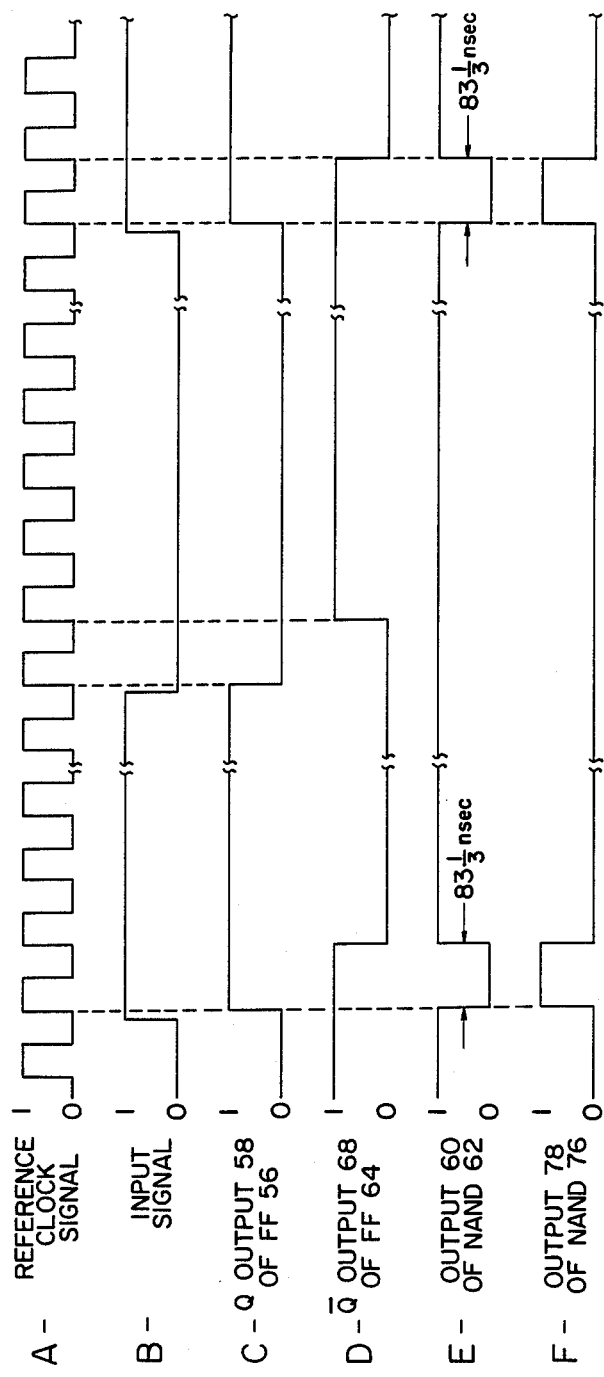

4,773,031

METHOD AND CIRCUIT FOR DIGITAL FREQUENCY MULTIPLICATION

TECHNICAL FIELD

The present invention relates to techniques for multiplying the frequency of an electrical signal of changing frequency and, in particular, to a method and circuit that employ digital techniques for processing information relating to a repetitive input signal of a first frequency and rapidly developing from the information a repetitive output signal of a second frequency which is a predetermined multiple of the first frequency.

BACKGROUND OF THE INVENTION

Frequency multiplier circuits provide an output signal whose frequency is a multiple of that of an input signal. For example, in an analog frequency multiplier, an input signal is applied to a nonlinear device that produces at its output a plurality of signals in a frequency spectrum whose components are integer multiples of the frequency of the input signal. A filter of predetermined center frequency and bandwidth is positioned at the output of the nonlinear device to select the signal component of the desired frequency.

Phase locked loop circuitry is frequently used in frequency multiplication of an input signal whose frequency is time varying. Conventional phase locked loops employ analog, digital, or a hybrid of analog and digital circuitry in a feedback arrangement. The phase locked loop develops an error signal by mixing a reference signal and the output signal of a voltage controlled oscillator and uses feedback of the error signal to control the frequency of the output signal of the voltage controlled oscillator.

Phase locked loops can be configured to change the frequency of an output signal in selectable frequency steps of other than integer multiples of the frequency of the reference signal. The disadvantage of using a phase locked loop is that there can exist a substantial delay in the response of the output signal to a change in the frequency of the reference signal. In many instances, this delay is dictated by circuit parameters selected to stabilize the loop. Under such conditions, the phase locked loop does not have the ability to track and respond rapidly to changes in frequency of the input signal.

SUMMARY OF THE INVENTION

An object of this invention is, therefore, to provide a method that uses digital techniques in processing an input signal to rapidly develop in response to a change in its frequency an output signal whose frequency is a multiple of that of the input signal.

Another object of this invention is to provide a circuit for developing an output signal whose frequency is multiple of an input signal.

A further object of this invention is to provide such a circuit whose multiplication factor is not restricted to an integer value.

Still another object of this invention is to provide a circuit that employs digital techniques for producing an output signal whose frequency is a multiple of that of an input signal without suffering a performance trade-off between response time and stability.

The present invention relates to a method of providing and a circuit for a digital frequency multiplier. The frequency multiplier receives a repetitive input signal of a first frequency and develops a repetitive output signal of a second frequency that is a multiple of the first frequency. This invention is especially useful in applications requiring that the frequency of the output signal be a noninteger multiple of, and/or respond rapidly to changes in, the frequency of the input signal.

The method of this invention includes the steps of measuring the duration of a portion of the input signal by determining the number of time increments $T_1$ included within the portion, providing a digital signal that represents the number of time increments $T_1$, programming the modulus of a digital counter by initializing the counter with a digital word corresponding to the digital signal, and clocking the counter with a clock signal of period $T_2$ to produce a repetitive output signal of a frequency that is proportional to $T_1/T_2$ times the frequency of the input signal.

In a preferred embodiment, the duration of one cycle of the input signal is the portion that is measured. The digital word is obtained from the output of a separate digital counter by initially programming the counter to its maximum value and then decrementing the counter at a rate of $1/T_1$ for the duration of the cycle.

The circuit of this invention is a digital frequency multiplier comprising an input circuit for receiving a repetitive input signal. A first binary counter receives from the input circuit the input signal and measures its period. The first counter is clocked by a signal of frequency $1/T_1$ for the duration of a predetermined portion of the input signal, to develop at its output a digital signal that represents the period of the input signal. A second binary counter receives and uses the digital signal to define the modulus of the second counter. The second counter is clocked by a signal of frequency $1/T_2$ to develop at its output a repetitive signal whose frequency is proportional to $T_1/T_2$ times the frequency of the input signal.

The circuit also includes synchronizing circuitry within the input circuit to synchronize the input signal to the clock signals of frequencies $1/T_1$ and $1/T_2$. Synchronizing the clocks to the input signal facilitates the use of binary counters in measuring the period of the input signal and developing the output signal.

The method and circuit of this invention develop an output signal of the desired frequency in rapid response to a change in the frequency of an input signal. The multiplication factor is determined by the ratio $T_1/T_2$ of the periods of the digital counter clocks. The periods of these clocks can be changed to provide a frequency multiplication factor of a noninteger value. Whenever one cycle of the input signal is measured in determining its period, the output signal developed in accordance with the invention reflects after one cycle of the input signal a change in its frequency.

Additional objects and advantages of the present invention will be apparent from the following detailed description of a preferred embodiment thereof, which proceeds with reference to the accompanying drawings.

BRIEF DESCRIPTION OF THE DRAWINGS

FIG. 3 is a diagram showing the timing relationship of the signals associated with the circuit diagrams of FIGS. 2A and 2B.

DETAILED DESCRIPTION OF PREFERRED EMBODIMENT

I. Method of Frequency Multiplication

Figure 1:
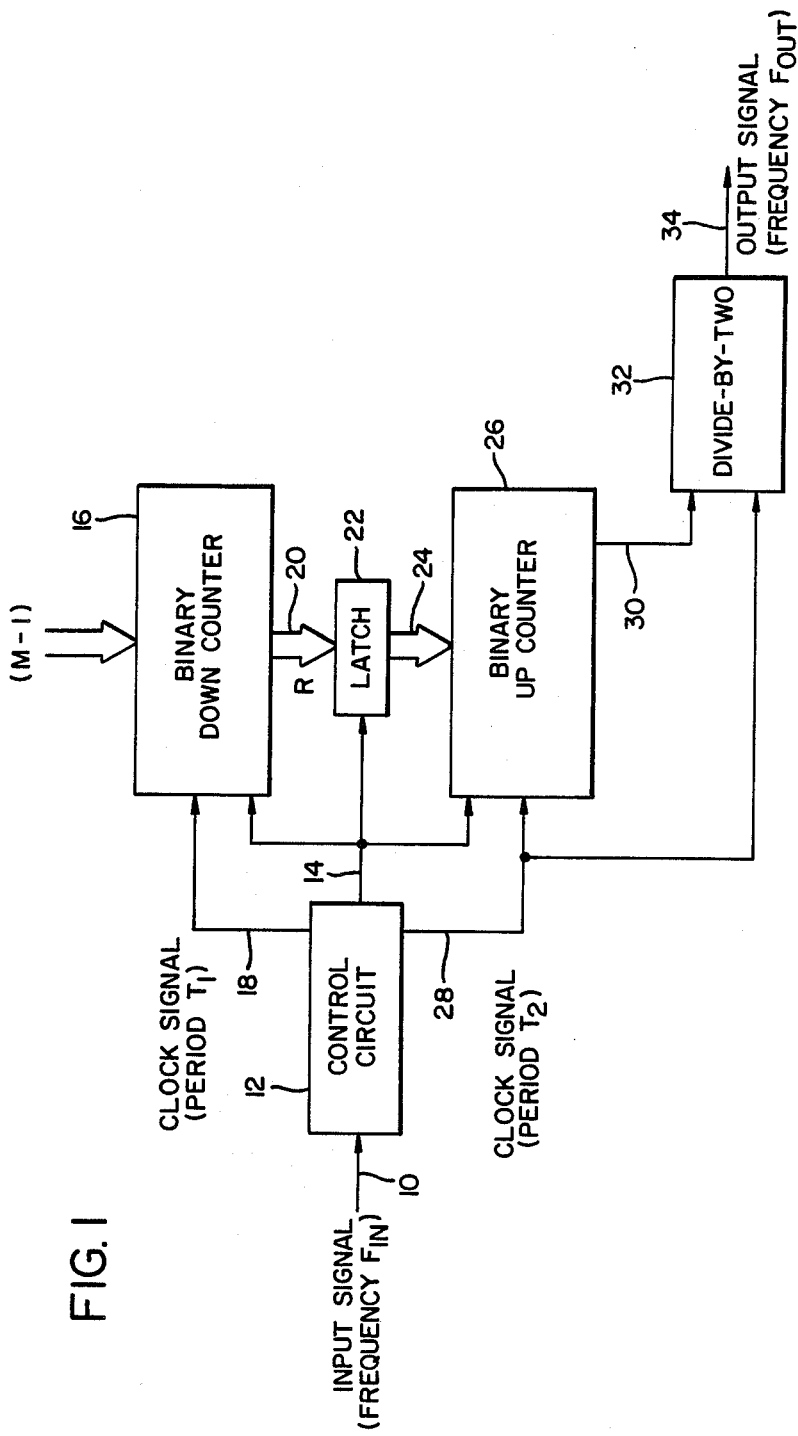
FIG. 1 is a block diagram showing the functional relationship of the signals processed in accordance with the method of the present invention.

FIG. 1 is a block diagram showing the digital processing system used to practice the method of the present invention. With reference to FIG. 1, a repetitive input signal of frequency $F_{IN}$ is applied to input 10 of a control circuit 12 that synchronizes the input signal to two clock signals of different periods $T_1$ and $T_2$ developed from a reference clock signal generator provided therein. Control circuit 12 also develops at its output 14 a stream of digital timing pulses that undergo a transition from a first logic state to a second logic state each time the input signal begins a new cycle. The timing pulses coordinate the processing of the digital signals developed in accordance with the method of this invention.

A binary down counter 16 measures the period of the input signal of frequency $F_{IN}$ by determining the number, N, of time increments $T_1$ that are included within one cycle of the synchronized input signal. This measurement is initiated upon receipt by down counter 16 of a timing pulse from output 14 of control circuit 12 and is accomplished by decrementing down counter 16 at a rate of $1/T_1$ from a programmed initial count equal to its maximum value. Decrementing down counter 16 is accomplished by applying to its clocked input a clock signal of period $T_1$ that appears at output 18 of control circuit 12. The measurement of a cycle is completed upon the receipt by down counter 16 of the next succeeding timing pulse, and the digital word appearing at output 20 of down counter 16 is delivered to the input of, and is stored in, latch circuit 22. Measurement of the next succeeding cycle of the input signal commences also at this time.

The value of the digital word stored in latch circuit 22 represents the remainder value at the output of down counter 16 after it was decremented N times from its maximum value during the cycle of the synchronized input signal. The maximum value of down counter 16 is its natural modulus, M, minus 1. For example, the maximum value (M−1) of a counter comprising three four-bit binary counters is $2^{12}$-1. The value of the digital word stored in latch circuit 22, therefore, is R=(M−1)-N, which is sometimes referred to herein as the digital remainder word.

The digital remainder word stored in latch circuit 22 after the termination of the cycle of the synchronized input signal is applied to the data inputs 24 of a binary up counter 26 at the start of the next succeeding cycle of the synchronized input signal. The digital remainder word applied to the data inputs of up counter 26 determines its modulus. Up counter 26 is incremented by a clock signal of period $T_2$ that appears at output 28 of control circuit 12. While down counter 16 measures the period of the next succeeding cycle of the synchronized input signal, up counter 26 produces at its carry output 30 an overflow signal each time up counter 26 receives N number of pulses from the clock signal of period $T_2$. Output 30 of up counter 26 is applied to the input of divide-by-two circuit 32, which provides at its output 34 a signal of a 50% duty cycle and a frequency $F_{OUT}$ that is half of that of the overflow signal. The frequency $F_{OUT}$ is related to the frequency $F_{IN}$ of the input signal as follows.

The period $T_{OUT}$ of the output signal can be expressed as $$T_{OUT}/2 = N_{UP} \times T_2$$

where $N_{UP}$ equals (M−1)-R, which represents the difference between the maximum value (M−1) of down counter 16 and the value of the digital remainder word R at the output of down counter 16 after measurement of the period of a cycle of the input signal is completed. Digital remainder word R can also be expressed as (M−1)-($T_{IN}/T_1$), where $T_{IN}$ is the period of the input signal of frequency $F_{IN}$ and $T_{IN}/T_1$ is the number of down clock counts for one cycle of the input signal.

The period $T_{OUT}$ of the output signal can be rewritten as:

$$\begin{aligned} T_{OUT}/2 &= [(M-1) - R] \times T_2 \\ &= \{(M-1) - [(M-1) - (T_{IN}/T_1)]\} \times T_2 \\ &= T_{IN} \times (T_2/T_1) \\ T_{OUT} &= 2T_{IN} \times (T_2/T_1). \end{aligned}$$

The frequency $F_{OUT}$ of the output signal, therefore, can be expressed as $F_{OUT} = (T_1/2T_2) \times F_{IN}$.

The equation above reveals that the multiplication factor is proportional to the ratio of the periods of the clock signals applied to down counter 16 and up counter 26. The frequencies of the clock signals can be selected so that the quantity $T_1/2T_2$ is not an integer value.

II. Design of Multiplier Circuit

Figure 2A:
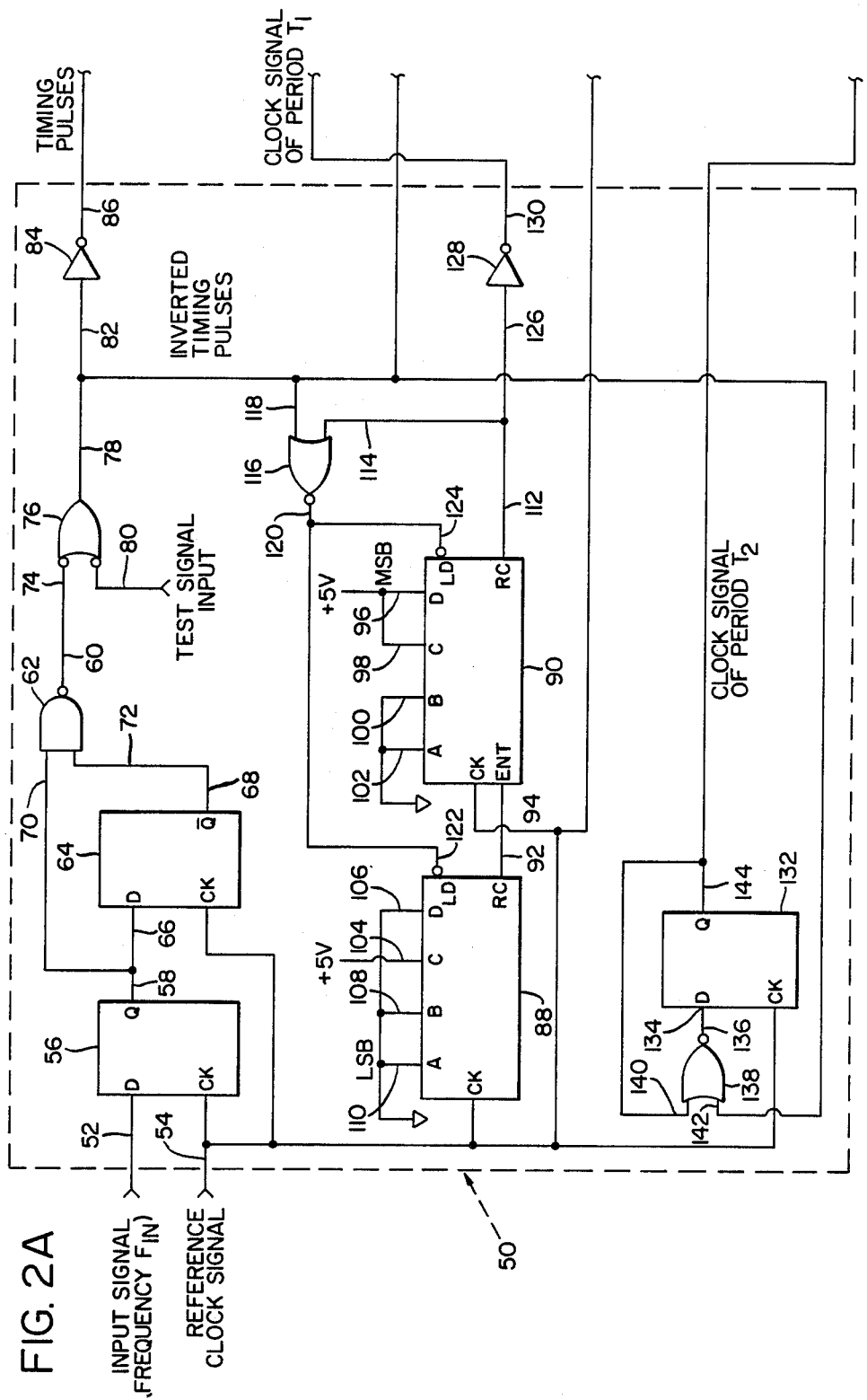
FIG. 2A is a circuit diagram of the control subcircuit of the digital frequency multiplier of the present invention.
Figure 2B:
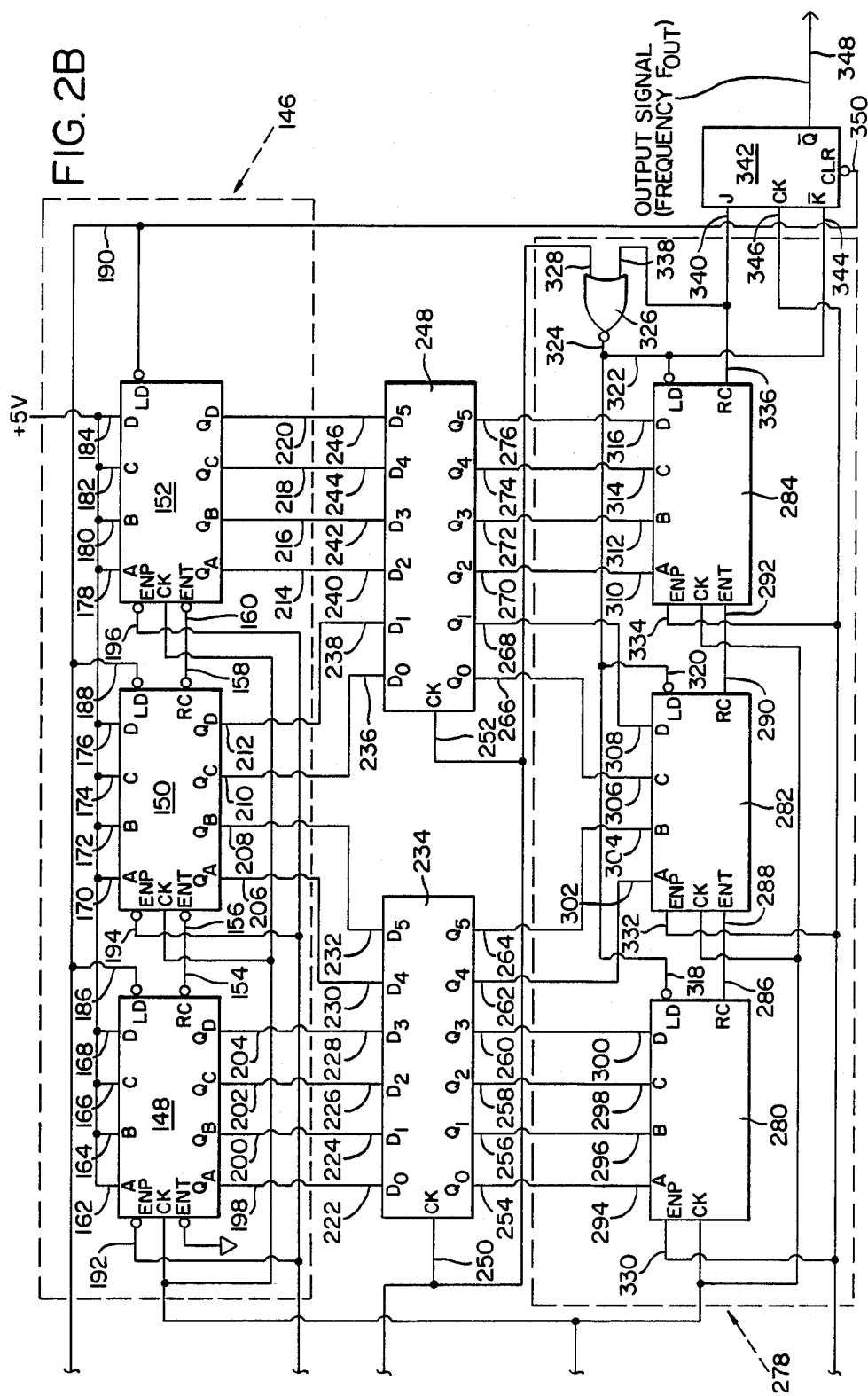
FIG. 2B is a circuit diagram of the up counter and down counter subcircuits of the digital frequency multiplier of the present invention.

FIGS. 2A and 2B and FIG. 3 are, respectively, circuit diagrams of and a timing diagram of the signals developed by a preferred embodiment of the digital frequency multiplier of the present invention.

Control Subcircuit

With reference to FIG. 2A, a preferred embodiment of the digital frequency multiplier comprises a control subcircuit 50 that receives at input terminal 52 a repetitive input signal of frequency $F_{IN}$ and develops from it a stream of digital timing pulses for coordinating the operation of the digital frequency multiplier. Control subcircuit 50 develops two clock signals of different frequencies that are derived from a reference clock signal which is applied to input terminal 54. Both the input signal and the reference clock signal have TTL logic compatible voltage levels.

To function properly, the frequency multiplier requires that the reference clock frequency be much greater than that of the input signal. This frequency constraint is necessary because it affects the resolution in the measurement of the period of the input signal and, consequently, the resolution of the frequency of the output signal. In the preferred embodiment, the reference clock signal frequency is 12 MHz and the input signal frequency is nominally about 125 Hz.

Control subcircuit 50 develops a stream of timing pulses that are synchronized to the reference clock signal. Transitions from a logic 1 state to a logic 0 state of the timing pulses indicate the start of a cycle of the synchronized input signal.

With reference to FIG. 3, synchronization is accomplished by applying the reference clock signal (line A) appearing on terminal 54 and the input signal (line B) appearing on terminal 52 to, respectively, the CK (clock) input and the D input of D flip-flop 56. The signal (line C) appearing at Q output 58 of flip-flop 56 represents a version of the input signal that is synchronized to the reference clock signal appearing on terminal 54. It will be appreciated that the period of the synchronized input signal at Q output 58 of flip-flop 56 can be different from the actual input signal by as much as one period of the reference clock signal. For a 12 MHz reference clock signal, the maximum difference would be 83 ⅓ nsec, which represents a maximum error of about 0.001% in the period of an input signal of 125 Hz. Minimizing this error is another reason why the reference clock signal frequency is chosen to be much greater than that of the input signal.

The stream of timing pulses (line E) is developed at output 62 of NAND gate 60. This is accomplished by applying the reference clock signal and Q output 58 of flip-flop 56 to, respectively, the CK input and the D input 66 of flip-flop 64. The signal (line D) at $\overline{Q}$ output 68 of flip-flop 64 is an inverted and delayed (by 83 ⅓ nsec) replica of the signal (line C) at Q output 58 of flip-flop 56. The Q output 58 of flip-flop 56 and $\overline{Q}$ output 68 of flip-flop 64 are applied, respectively, to inputs 70 and 72 of NAND gate 62 to provide the stream of timing pulses.

As shown in FIG. 3, the signal (line E) at output 60 of NAND gate 62 changes from a logic 1 state to a logic 0 state only when the synchronized input signal (line C) begins a cycle, i.e., when it changes from a logic 0 state to a logic 1 state. Each timing pulse (line E) remains in a logic 0 state for only one cycle of the reference clock signal (83 ⅓ nsec for a 12 MHz reference clock signal), irrespective of the duty cycle of the input signal. The D flip-flops 56 and 64 are SN74LS74 or equivalent devices.

Output 60 of NAND gate 62 is applied to input 74 of NAND gate 76 to develop at its output 78 a stream of inverted timing pulses (line F) for delivery to certain devices in the multiplier circuit. The stream of inverted timing pulses appears whenever input 80 of NAND gate 76 is in a logic 1 state. NAND gate 76 provides at its input 80 a testing means for injecting a simulated input signal into control subcircuit 50. Input 80 of NAND gate 76 is in a logic 1 state during normal operation of the multiplier circuit. Output 78 of NAND gate 76 is applied to input 82 of inverter 84 to develop at its output 86 during normal operation a stream of timing pulses identical with that appearing at output 60 of NAND gate 62 (line C) for delivery to certain devices in the multiplier circuit.

The reference clock signal appearing on terminal 54 is also applied to the CK inputs of presettable four-bit counters 88 and 90, which are SN74LS163 or equivalent devices. The RC (ripple carry) output 92 of counter 88 is applied to the ENT (enable T) input 94 of counter 90 to provide an eight-stage synchronously operating divide-by-sixty binary counter. The divide-by-sixty operation is accomplished by programming into counters 88 and 90 an initial count of hexadecimal value C4 each time the eight-stage counter overflows. Counter 90 is programmed with the hexadecimal value C by connecting its data inputs 96 and 98 to +5 volts and data inputs 100 and 102 to ground potential. Counter 88 is programmed with the hexadecimal value 4 by connecting its data input 104 to +5 volts and data inputs 106, 108, and 110 to ground potential.

An overflow pulse appears at RC output 112 of counter 90 after sixty pulses are received at the CK inputs of counters 88 and 90. The RC output 112 of counter 90 is connected to input 114 of NOR gate 116. Input 118 of NOR gate 116 receives the stream of inverted timing pulses at output 78 of NAND gate 76. Output 120 of NOR gate 116 is applied to the LD (load) inputs 122 and 124 of counters 88 and 90, respectively.

Whenever the overflow signal at output 112 of counter 90 changes from a logic 0 state to a logic 1 state, the signal at output 120 of NOR gate 116 changes from a logic 1 state to a logic 0 state, thereby loading into counters 88 and 90 the signals applied to their respective data inputs. An overflow signal appears repetitively at output 112 of counter 90 after counters 88 and 90 receive sixty pulses from the reference clock signal. Counters 88 and 90 form, therefore, a counter circuit having a modulus of sixty.

Counters 88 and 90 are also programmed with the hexadecimal value C4 by a change from a logic 0 state to a logic 1 state of the stream of timing pulses appearing at output 78 of NAND gate 76. This change between logic states occurs at the start of each cycle of the synchronized input signal to synchronize the operation of a divide-by-sixty counter to it.

The signal at RC output 112 of counter 90 is applied to input 126 of and is inverted by inverter 128. The signal at output 130 of inverter 128 is denominated the clock signal of period $T_1$ (5 μsec for a 12 MHz reference clock signal) which operates a down counter as will be described below. It will be appreciated that the clock signal of period $T_1$ does not have a 50% duty cycle because it is an inverted version of the overflow signal of counter 90, which signal is a pulse of one clock period that appears once each time the divide-by-sixty counter receives sixty pulses from the reference clock signal.

The reference clock signal appearing on terminal 54 is also applied to the CK input of D flip-flop 132. The D input 134 of flip-flop 132 is connected to output 136 of NOR gate 138, whose inputs 140 and 142 receive signals from, respectively, Q output 144 of flip-flop 132 and output 78 of NAND gate 76. Except at the beginning of a cycle of the synchronized input signal, the signal applied to input 142 of NOR gate 138 is in a logic 0 state. Under this condition, NOR gate 138 functions as an inverter of the signal at Q output 144 of flip-flop 132, which operates at a divide-by-two counter of the reference clock signal.

Input 142 of NOR gate 138 changes from a logic 0 state to a logic 1 state upon the start of a cycle of the synchronized input signal. Under this condition, Q output 144 of flip-flop 132 remains in the logic 0 state for one period (83 ⅓ nsec) of the reference clock signal to synchronize the operation of the divide-by-two counter to the start of the cycle of the synchronized input signal. The Q output 144 of flip-flop 132 is denominated the clock signal of period $T_2$ (166 ⅔ nsec for a 12 MHz reference clock signal) which operates an up counter as will be described below. The signal at Q output 144 of flip-flop 132 has a 50% duty cycle.

Down Counter Subcircuit

The digital frequency multiplier comprises a down counter subcircuit 146 that includes programmable four-bit counters 148, 150, and 152 that form a 12-stage synchronously operating binary down counter which is used to measure the period of the synchronized input signal. Counters 148, 150, and 152 are SN74LS169 or equivalent devices. The reference clock signal appearing on terminal 54 is applied to the CK (clock) input of each one of counters 148, 150, and 152 to clock down counter 146. The counters are arranged for synchronous operation by connecting RC (ripple carry) output 154 of counter 148 to ENT (enable T) input 156 of counter 150 and by connecting RC output 158 of counter 150 to ENT input 160 of counter 152.

Down counter 146 can be programmed to an initial value $M-1$, which represents the maximum value $(2^{12}-1)$ of the counter, where M is the modulus of the counter. Programming down counter 146 with its maximum value is accomplished by connecting data inputs 162, 164, 166, 168 of counter 148, data inputs 170, 172, 174, 176 of counter 150, and data inputs 178, 180, 182, 184 of counter 152 to +5 volts. The LD (load) inputs 186, 188, and 190 of the respective counters 148, 150, and 152 are connected to output 86 of inverter 84 on which the stream of timing pulses appears. Whenever the signal at output 86 of inverter 84 changes from a logic 1 state to a logic 0 state, down counter 146 is programmed with its maximum value. As was indicated above, such a transition between logic states indicates the start of a cycle of the synchronized input signal.

The clock signal of period $T_1$ is applied to each one of ENP (enable P) inputs 192, 194, and 196 of the respective counters 148, 150, and 152. Having been programmed with its maximum value, down counter 146 is decremented at a rate of $1/T_1$. This is accomplished by reason of the character of the waveform of the clock signal of period $T_1$. Counters 148, 150, and 152 count in response to the reference clock signal that is applied to their CK inputs only when their respective ENP inputs 192, 194, and 196 are in a logic 0 state. Since it is derived from RC output 112 of counter 90, the clock signal of period $T_1$ is in a logic 0 state for the duration of only one cycle of the reference clock signal in each time interval $T_1$. The reference clock signal perforce can decrement down counter 146 by only one count in each time interval $T_1$. Down counter 146 is, therefore, effectively decremented at a rate of $1/T_1$ until the end of the cycle of the sychronized input signal. The logic states appearing at Q outputs 198, 200, 202, 204 of counter 148, Q outputs 206, 208, 210, 212 of counter 150, and Q outputs 214, 216, 218, 220 of counter 152 represent the number of counts remaining in down counter 146 at the end of the cycle of the synchronized input signal.

During a cycle of the synchronized input signal, down counter 146 is decremented from its maximum value N number of times at a rate of $1/T_1$ The product of $N \times T_1$ represents the period of the cycle of the synchronized input signal and, to within a maximum error of one period of the reference clock signal, the period of the input signal applied to terminal 52. The ability to resolve changes in the period of the input signal is, therefore, limited by the accuracy and period of the reference clock signal.

The count appearing at the Q outputs of down counter 146 at the end of a cycle of the synchronized input signal is a digital parallel word of value $(M-1)-N$ and is called the digital remainder word. The digital remainder word $(M-1)-N$ corresponds to the period $N \times T_1$ the input signal. A digital remainder word that does not represent the period of the input signal results whenever down counter 146 underflows. The dynamic range of the digital frequency multiplier is, therefore, limited by the number of stages of down counter 146.

Each one of the Q outputs of counters 148, 150, and 152 of down counter 146 is applied to a different one of D inputs 222, 224, 226, 228, 230, 232 of latch device 234 and D inputs 236, 238, 240, 242, 244, 246 of latch device 248. The CK (clock) inputs 250 and 252 of latch devices 234 and 248, respectively, are connected to output 78 of NAND gate 76. The digital remainder word applied to the D inputs of latch devices 234 and 248 is inscribed into the latch devices whenever the stream of inverted timing pulses at output 78 of NAND gate 76 changes from a logic 0 state to a logic 1 state, thereby indicating the beginning of the next cycle of the synchronized input signal. The digital word inscribed in latch devices 234 and 248, therefore, is the digital remainder word of down counter 146 for the immediately preceding cycle of the synchronized input signal. The digital remainder word inscribed in latch devices 234 and 248 appears at Q outputs 254, 256, 258, 260, 262, 264 of latch device 234 and Q outputs 266, 268, 270, 272, 274, 276 of latch device 248.

Up Counter Subcircuit

The digital frequency multiplier comprises an up counter subcircuit 278 that includes programmable four-bit counters 280, 282, and 284 that form a twelve-stage synchronously operating binary up counter which is used as a programmable oscillator. Counters 280, 282, and 284 are SN74LS163 or equivalent devices. The reference clock signal appearing on terminal 54 is applied to the CK (clock) input of each one of counters 280, 282, and 284 to clock up counter 278. The counters are arranged for synchronous operation by connecting RC (ripple carry) output 286 of counter 280 to ENT (enable T) input 288 of counter 282 and by connecting RC output 290 of counter 282 to ENT input 292 of counter 284.

Up counter 278 can be programmed to an initial value that is the digital remainder word appearing at the Q outputs of latch devices 234 and 248. Programming up counter 278 with the digital remainder word is accomplished by connecting data inputs 294, 296, 298, 300 of counter 280 to, respectively, Q outputs 254, 256, 258, 260 of latch device 234; data inputs 302, 304, 306, 308 of counter 282 to, respectively, Q outputs 262 and 264 of latch device 234 and Q outputs 266 and 268 of latch device 248; and data inputs 310, 312, 314, 316 of counter 284 to, respectively, Q outputs 270, 272, 274, 276 of latch device 248. The LD (load) inputs 318, 320, and 322 of the respective counters 280, 282, and 284 are connected to output 324 of NOR gate 326. The stream of inverted timing pulses at output 78 of NAND gate 76 is applied to input 328 of NOR gate 326 and causes its output 324 to change from a logic 1 state to a logic 0 state at the beginning of each cycle of the synchronized input signal. Such a transition between logic states programs up counter 278 to the value of the digital remainder word appearing at the Q outputs of latch devices 234 and 248.

The clock signal of period $T_2$ is applied to each one of ENP (enable P) inputs 330, 332, and 334 of the respective counters 280, 282, and 284. Having been programmed with the digital remainder word, up counter 278 is incremented at a rate of $1/T_2$ because counters 280, 282, and 284 count in response to the reference clock signal only when their respective ENP inputs 330, 332, and 334 are in a logic 1 state, which occurs for the duration of the period of the reference clock signal once in each $T_2$ increment. Up counter 278 is, therefore, effectively incremented at a rate of $1/T_2$ until the end of the cycle of the synchronized input signal.

The RC output 336 of counter 284 is applied to input 338 of NOR gate 326. Whenever up counter 278 overflows, the signal at RC output 336 of counter 284 changes from a logic 0 state to a logic 1 state which causes the digital remainder word appearing at the data inputs of counters 280, 282, and 284 to be programmed therein. Programming up counter 278 in this manner sets its modulus to a value equal to $2^{12}-[(M-1)-N]$, where $2^{12}$ is the natural modulus of up counter 278 and $[(M-1)-N]$ is the value of the digital remainder word of down counter 146.

Input 328 of NOR gate 326 is connected to output 78 of NAND gate 76 to synchronize the operation of up counter 278 to the start of a cycle of the synchronized input signal. The value programmed in counters 280, 282, and 284 represents the digital remainder word corresponding to the immediately preceding cycle of the synchronized input signal measured by down counter 146. Thus, up counter 278 operates as a programmable oscillator whose output frequency is determined by the overflow rate of the up counter. The output frequency of up counter 278 is dictated by the digital remainder word, which is updated after each cycle of the synchronized input signal.

The RC output 336 of counter 284 is applied to the J input 340 of a JK flip-flop 342 and to input 338 of NOR gate 326, whose output 324 is applied to the $\overline{K}$ input 344 of flip-flop 342. The clock signal of period $T_2$ appearing at Q output 144 of D flip-flop 132 is applied to the clock input 346 of JK flip-flop 342. In this arrangement, flip-flop 342 divides by two the output signal frequency of up counter 278. The $\overline{Q}$ output 348 of flip-flop 342 provides the output signal of frequency $F_{OUT}$ of the digital frequency multiplier.

The timing pulses appearing at output 86 of inverter 84 are applied to the CLR (clear) input 350 of flip-flop 342. At the start of each cycle of the synchronized input signal, the timing pulse is in the logic 0 state, which resets flip-flop 342 and synchronizes its operation to that of the rest of the multiplier circuit.

Flip-flop 342 performs two separate functions. The first function is the provision of an output signal with a 50duty cycle, and the second function is the prevention of the loss of an overflow pulse at the RC output 336 of counter 284 just before the start of the next succeeding cycle of the synchronized input signal. Since the digital remainder word is loaded into up counter 278 upon a change from a logic 0 state to a logic 1 state of the synchronized input signal, edge jitter of the input signal can cause such a loading operation to occur before the last overflow pulse appears at RC output 336 of counter 284. Flip-flop 342 prevents the occurrence of this problem because it is reset upon the transition from a logic 0 state to a logic 1 state of the synchronized input signal.

The frequency of the output signal is $T_1/2T_2$ times that of the synchronized input signal. In the preferred embodiment, the multiplication factor $T_1/2T_2$ equals 15. The output signal of frequency $F_{OUT}$ of the digital frequency multiplier is a repetitive digital signal whose frequency changes within one cycle of the change in frequency of $F_{IN}$ of the input signal.

Frequency Multiplier Circuit Operation

At the start of an exemplary cycle of the synchronized input signal, the digital frequency multiplier circuit operates in the following manner. The signal at output 78 of NAND gate 76 changes from a logic 0 state to a logic 1 state, thereby programming the divide-by-sixty counters 88 and 90 with the hexadecimal value C4 and loading the digital remainder word of the immediately preceding cycle into counters 280, 282, and 284 of up counter 278 through latch devices 234 and 248. During this time, output 86 of inverter 84 changes from a logic 1 state to a logic 0 state, thereby loading counters 148, 150, and 152 of down counter 146 with its maximum value.

Two separate events take place simultaneously within the multiplier circuit during the exemplary cycle of the synchronized input signal. First, down counter 146 is decremented from its maximum value at a rate of $1/T_1$. The digital signal appearing at the Q outputs of down counter 146 at the end of the exemplary cycle is the digital remainder word $(M-1)-N$ that corresponds to the period of the synchronized input signal. Second, up counter 278 is incremented at a rate of $1/T_2$ and provides at its RC output 336 an overflow signal that appears each time the up counter is incremented N number of times. The value N represents the number of times down counter 146 was decremented during the immediately preceding cycle.

The frequency of the signal at output 336 of counter 284 is divided by two by flip-flop 342 whose $\overline{Q}$ output provides the output signal of the multiplier circuit, which signal has a frequency equal to $T_1/2T_2$ times the frequency of the synchronized input signal. The frequency of the output signal is, therefore, based upon the period measured of the immediately preceding cycle of the synchronized input signal. Since the frequency of the reference clock signal is much greater than that of the input signal, the frequency of the synchronized input signal is essentially equal to that of the input signal applied to terminal 52.

It will be obvious to those having skill in the art that many changes may be made in the above-described details of the preferred embodiment of the present invention. The scope of the present invention, therefore, should be determined only by the following claims.

I claim:

1. A digital frequency multiplier circuit, comprising: input means for receiving a repetitive input signal; a first counter in communication with the input means to measure the period of the input signal, the first counter being clocked by a signal of frequency $1/T_1$ for the duration of a predetermined portion of the input signal to develop at an output of the first counter a digital word representing the period of the input signal and during each predetermined portion of the input signal the first counter is decremented N times at the rate $1/T_1$ from an initial value $(M-1)$ to produce the digital word of value $((M-1)-N)$; and a second counter in communication with the first counter, the second counter receiving the digital signal to define the modulus thereof and the second counter being clocked by a signal of frequency $1/T_2$ to develop at an output of the second counter a repetitive signal whose frequency is proportional to $T_1/T_2$ times the frequency of the input signal.

2. The circuit of claim 1 in which the second counter comprises a binary counter having Y number of stages, the second counter developing as the repetitive output signal an overflow signal, the overflow signal undergoing a transition between logic states each time the signal of frequency $1/T_2$ loads into the second counter $2^Y-((M-1)-N)$ number of counts.

3. The circuit of claim 2 in which the second counter comprises a presettable binary counter and the digital word of value $((M-1)-N)$ is programmed into the second counter to define the modulus thereof.

4. The circuit of claim 1 in which the first and second counters comprise binary counters having an equal number of stages.

5. A digital frequency multiplier circuit, comprising:
input means for receiving a repetitive input signal;
a first counter in communication with the input means to measure the period of the input signal, the first counter being clocked by a signal of frequency $1/T_1$ for the duration of a predetermined portion of the input signal to develop at an output of the first counter a digital signal representing the period of the input signal; and
a second counter in communication with the first counter, the second counter receiving the digital signal to define the modulus thereof and the second counter being clocked by a signal of frequency $1/T_2$ to develop at an output of the second counter a repetitive signal whose frequency is proportional to $T_1/T_2$ times the frequency of the input signal, and the signals of frequencies $1/T_1$ and $1/T_2$ being synchronous to each other and the input signal being asynchronous to them, and the input means including means for synchronizing the input signal to the signals of frequencies $1/T_1$ and $1/T_2$ prior to the communication of the input signal to the first counter.

6. The circuit of claim 5 in which the first and second counters comprise binary counters having an equal number of stages.

7. In a digital frequency multiplier circuit that receives a repetitive input signal of a first frequency and rapidly develops a repetitive output signal of a second frequency which is a multiple of the first frequency, a method for developing the output signal comprising the steps of:
measuring the duration of a portion of the input signal by decrementing a first counter at a rate of $1/T_1$ during the portion of the input signal;
providing a digital remainder word at the output of the first counter whenever the first counter is initialized to its maximum value and is decremented during the portion of the input signal;
programming the modulus of a second counter with the digital remainder word; and
clocking the second counter at a rate of $1/T_2$ to produce a repetitive output signal of a first frequency that is proportional to $T_1/T_2$ times the first frequency.

8. The method of claim 7 in which the first and second counters comprise digital counters of the binary type.

9. The method of claim 7 in which the portion is one cycle of the input signal.

* * * * *